INVENTOR
H. A. SCHNEIDER
BY [signature]
ATTORNEY

May 26, 1959 H. A. SCHNEIDER 2,888,557

FREQUENCY DIVIDER CIRCUITS

Filed Sept. 17, 1954 5 Sheets-Sheet 2

INVENTOR
H. A. SCHNEIDER
BY Jones W. Falk
ATTORNEY

May 26, 1959 H. A. SCHNEIDER 2,888,557

FREQUENCY DIVIDER CIRCUITS

Filed Sept. 17, 1954 5 Sheets-Sheet 3

INVENTOR
H. A. SCHNEIDER
BY James D. Falk
ATTORNEY

INVENTOR
H. A. SCHNEIDER
BY [signature]
ATTORNEY

May 26, 1959 H. A. SCHNEIDER 2,888,557

FREQUENCY DIVIDER CIRCUITS

Filed Sept. 17, 1954 5 Sheets-Sheet 5

INVENTOR
H. A. SCHNEIDER
ATTORNEY

United States Patent Office 2,888,557
Patented May 26, 1959

2,888,557

FREQUENCY DIVIDER CIRCUITS

Herbert A. Schneider, Coytesville, N.J., assignor to Bell Telephone Laboratories, Incorporated, New York, N.Y., a corporation of New York Application September 17, 1954, Serial No. 456,648
14 Claims. (Cl. 250—27)

This invention relates to electrical circuits and more particularly to such circuits for frequency division.

In electronic computers and similar electrical information systems, a source of base or clock frequency is often provided. This clock frequency serves to define the time intervals of the information digits and to synchronize the various operations of the system. Additionally, however, it is necessary to provide a number of control signals. In serial digital computers repetitive operations are often performed at a submultiple of the basic clock signal or frequency. The initiation and synchronization of various computer operations accordingly depends on the availability of these single pulses occurring cyclically at predetermined intervals. These intervals may be of the order of once every ten, hundred, thousand, or even millions of cycles of the clock frequency. The generation of cyclically occurring pulses at a frequency which is a submultiple of the clock frequency has been termed frequency division.

It is a general object of this invention to provide improved circuits for frequency division.

In one specific embodiment of this invention, a large frequency division is attainable by employing two stages of frequency division. The first stage comprises a delay line register in which a single pulse is stored and circulated, appearing at the output once every $n$ digits or cycles of the clock frequency. The frequency division of the first stage is $1/n$ of the clock frequency. The second stage comprises a binary half adder with a delay line having an accumulation of $n$ digits of the clock frequency and a gating circuit. The single digit transmitted by the first stage circuit is counted by the second stage circuit until the half-adder delay line is full, at which time the gating circuit is enabled and a single pulse applied to the output lead. The frequency division of the second stage is $1/2^n$ of the clock frequency and thus the overall frequency division is $1/(n)\ (2^n)$ of the clock frequency.

Generally in such computers $n$ digits would define the word or information message. Accordingly, we can consider that the first stage of frequency division divides the clock frequency to the word frequency and the second stage of frequency division affords an output control pulse at some submultiple of the word frequency.

The first stage division may be attained advantageously by a number of delay line register circuits, the various delay lines providing different delays. The number of digits delay of the various lines should be relative primes or products thereof with respect to each other. The outputs of the various single circuits are applied to an And logic gate so that a pulse is transmitted to the second stage of frequency division only on the occurrence of outputs at all the single circuits in the first stage.

If it is desired to trigger the first stage of frequency division by a train of pulses at the clock frequency, rather than by a single initiating pulse, the first stage of division may be attained advantageously by a number of delay lines connected between the output and one input of an inhibitor circuit, the train of clock pulses being applied to the other input of the inhibitor circuit.

Additionally, the second stage of frequency division may include circuitry for repeating the single output pulse for exactly one half the cycle between output pulses, when it is desired to obtain a sinusoidal or other cyclical wave of the lower frequency.

A frequency divider in accordance with this invention may also have preset therein a number so that the frequency division attained by the second stage circuit is $1/[2^n-(\text{preset number})]$ of the word frequency. As the preset number may be any number from 0 to $2^n$, the second stage of frequency division can attain any desired division of the word frequency. As the input pulses to the second stage of frequency division need not in all cases define word frequency or word repetition rate, we can state that by presetting a number in a frequency divider circuit in accordance with this invention, any frequency division of the input pulses may be obtained provided that the frequency of the input pulses is smaller than the clock frequency which defines the digit intervals of the circuit.

It is a feature of this invention that a frequency divider include an adder circuit to which a single pulse is applied repetitively. The adder circuit counts the pulses up to the capacity of a delay line accumulator. When the delay line accumulator is full an output pulse is obtained from a gating circuit.

It is a further feature of this invention that a frequency divider include a first stage and a second stage, the first stage transmitting an output pulse once every $n$ digits in response to a single initiating pulse and the second stage including an adder circuit, an accumulator having $m$ digits of storage, and a gating circuit, $n$ and $m$ being related to each other by a constant $k$ which may be any positive integer. The output of the gating circuit is a train of pulses at a frequency substantially $1/(n)\ (2^m)$ of the clock frequency where $n=km$.

It is another feature of this invention that the first stage of frequency division may comprise a plurality of delay line registers, each register having a different delay and the delays of the various registers being related to each other in that they are prime relative to each other.

It is still another feature of this invention that the first stage of frequency division may comprise a plurality of delay lines, each having a different number of digits of delay from 1 to $(n-1)$ and connected between the output of an inhibitor circuit and one input lead thereof, a continuous train of clock pulses being applied to the other lead of the inhibitor circuit.

It is a further feature of certain embodiments of this invention that the second stage of frequency division be preset by applying thereto a certain number, so that the resultant frequency division depends on the number applied thereto.

It is a further feature of certain embodiments of this invention that memory and gating circuits be included in the novel combination so that the single output of the second stage of frequency division is repeated once every digit for exactly one half the cycle between successive outputs of the second stage.

A complete understanding of this invention and of these and other features thereof may be gained from consideration of the following detailed description and the accompanying drawing, in which.

Figure 2:
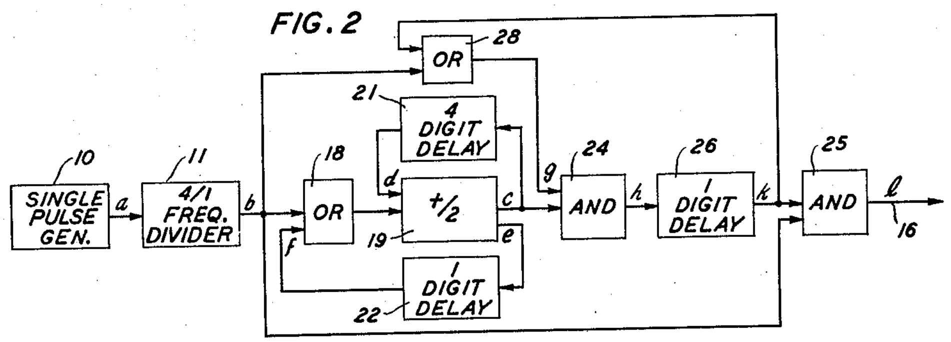
Fig. 2 is a more detailed block diagram of the embodiment of Fig. 1.
Figure 5:
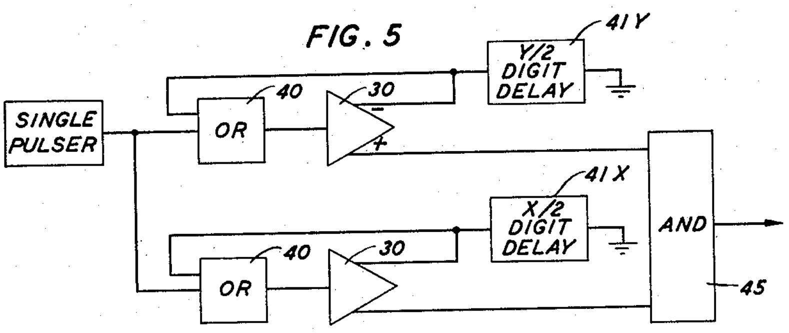
Figure 9:
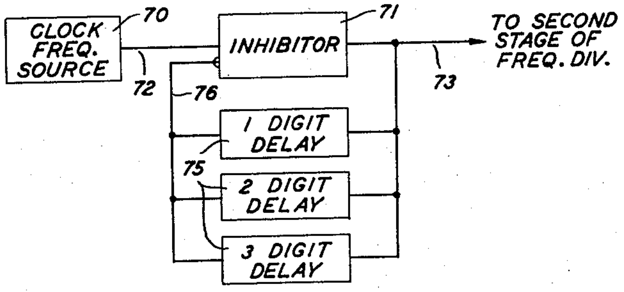
Figure 4A:
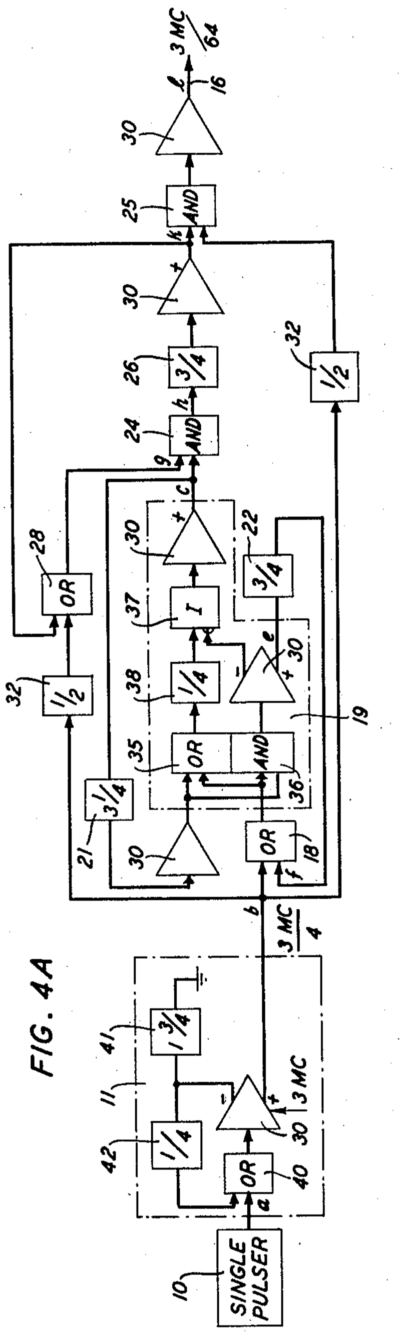
Figure 4B:
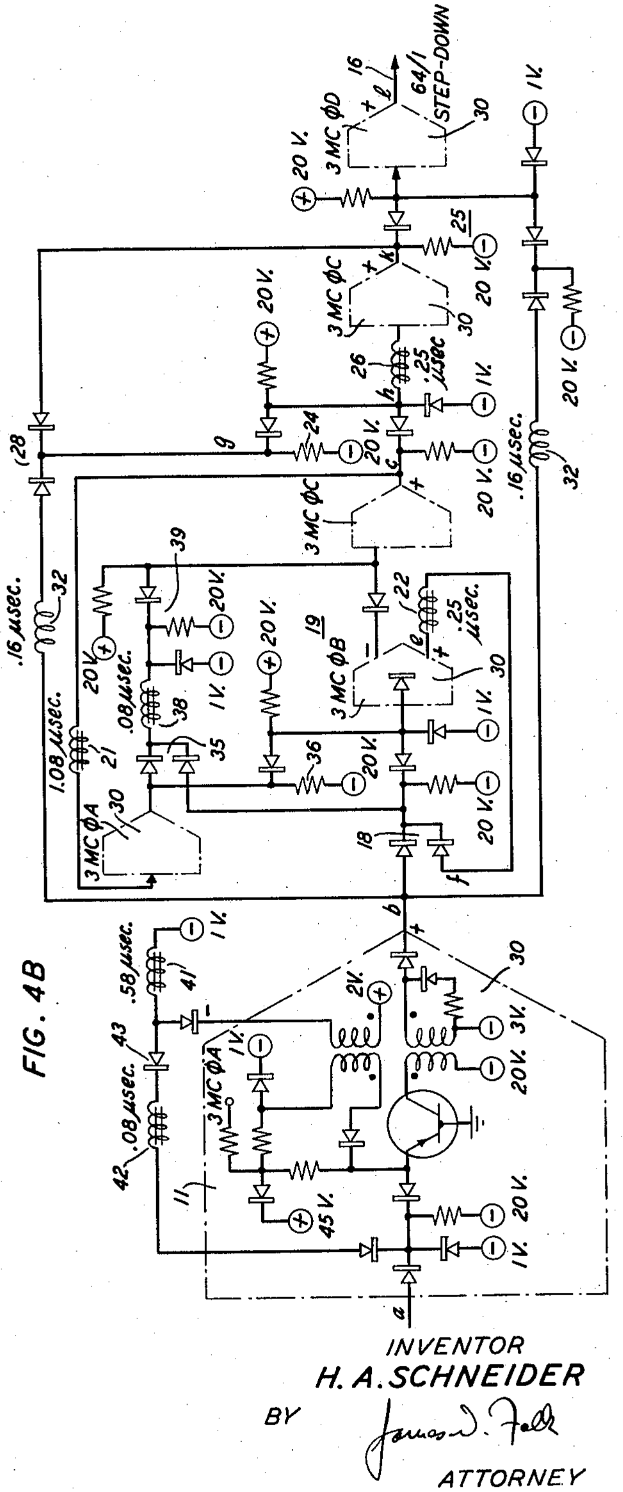
Figure 6:
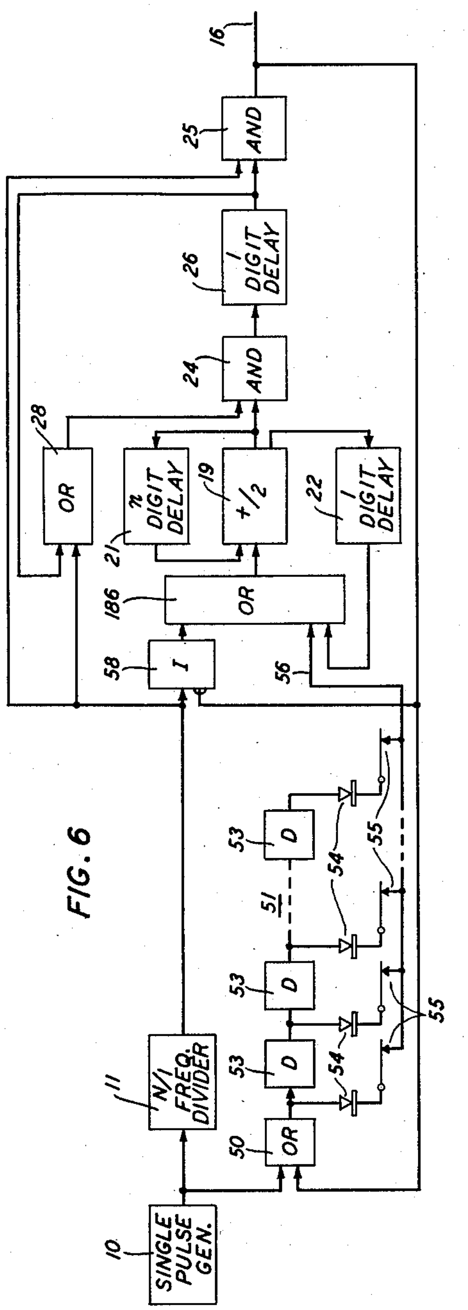
Figure 7:
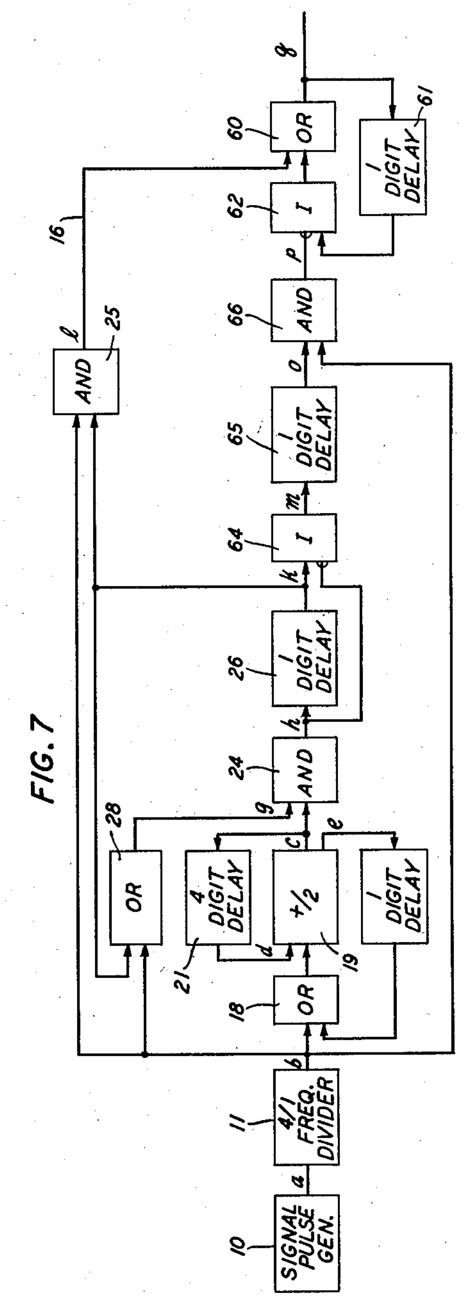
Figure 8:
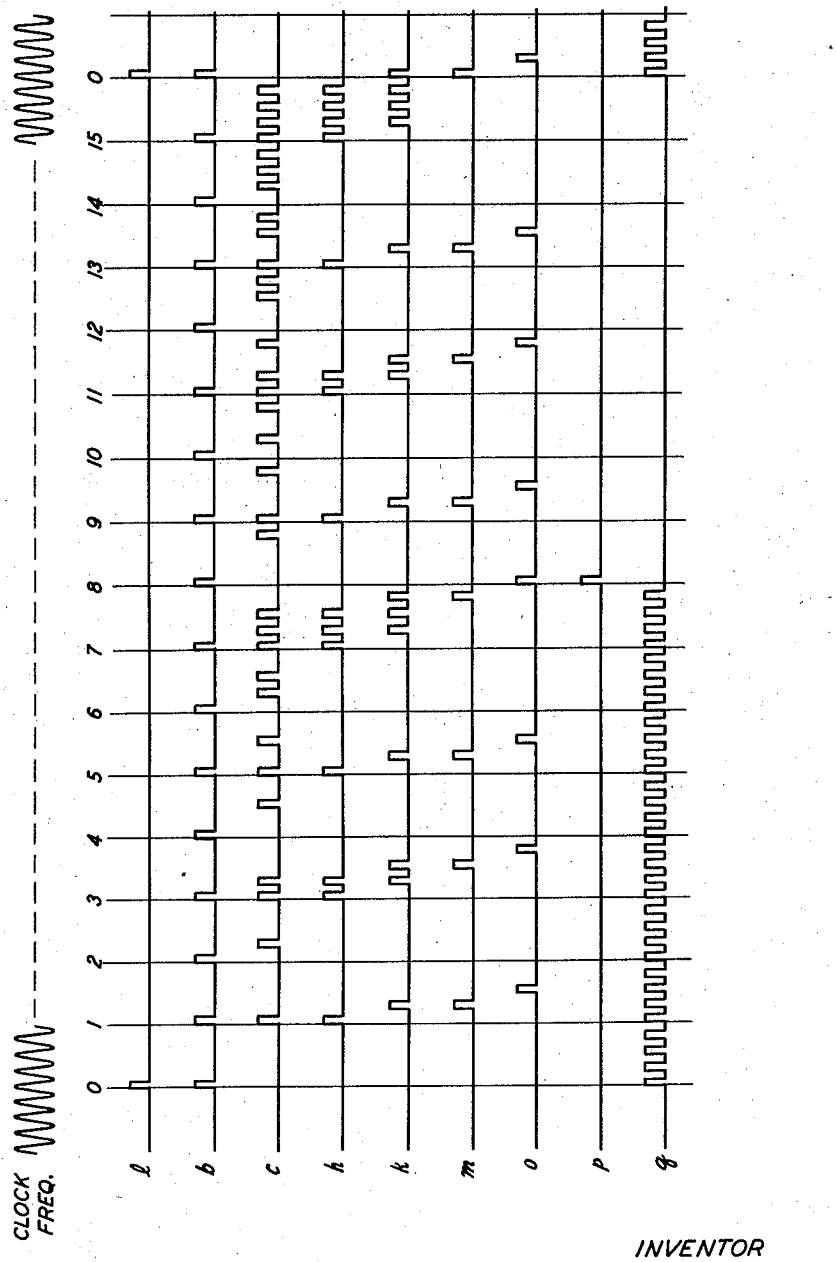

Fig. 4*a* is a block diagram of the embodiment of Fig. 2 modified to include the amplifiers and inherent delays therein, and showing one specific first stage frequency divider;

Fig. 4*b* is a schematic diagram of the embodiment of Fig. 4*a*;

Fig. 5 is a block diagram of another specific illustrative embodiment of a first stage frequency divider in accordance with this invention;

Fig. 6 is a block diagram of another specific illustrative embodiment of this invention wherein the second stage of frequency division is preset;

Fig. 7 is a block diagram of another specific illustrative embodiment of this invention wherein the output is not a single pulse but a train of pulses occurring for one half the period of the output frequency of the second stage circuit;

Fig. 8 is a pulse-time chart depicting the occurrence of pulses at various points in the embodiment of Fig. 7; and Fig. 9 is a block diagram of another specific embodiment of a first stage frequency divider in accordance with this invention.

Figure 1:
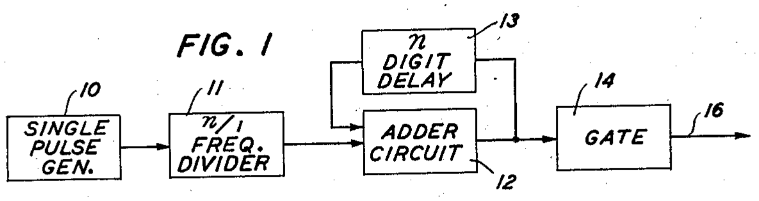
Fig. 1 is a simplified block diagram of one specific illustrative embodiment of a two stage frequency divider in accordance with this invention.

Turning now to the drawing, the illustrative embodiment of the invention depicted in Fig. 1 affords a frequency division of substantially $1/(n)(2^n)$, where $n$ is any digit. A single pulse is applied, from a single pulse generator 10, to a delay line register frequency divider 11, which provides a recurrent output pulse once every $n$ digits. This output is applied to a second stage of frequency division including an adder circuit 12, which may be either a full or half-adder circuit. The adder output is connected through an $n$ digit delay line 13 back to the input of the adder circuit. When the $n$ digit delay line 13 is filled, i.e., when sufficient digits have been added so that the output of the adder is a succession of $n$ pulses, a gate 14 is enabled and a single output pulse appears on an output lead 16. The adder circuit is also reset to begin the next cycle of frequency division on receipt of a pulse from the first stage frequency divider 11.

Accordingly, in the general combination of this specific embodiment of the invention there is a first stage of frequency division, attained by the employment of a delay line register circuit, and a second stage of frequency division, attained by the employment of circuitry for the accumulation of pulses from the first stage. Fig. 2 depicts one specific embodiment, in block diagram form, of the embodiment of the invention of Fig. 1; an understanding of this embodiment can be gained from a consideration of its operation together with the pulse-time chart of Fig. 3. In this embodiment it is assumed that $n=4$ and that the desired frequency division is $1/(4)(2^4)$ or $1/64$ of the clock frequency, which may be of the order of 3 megacycles.

Figure 3:
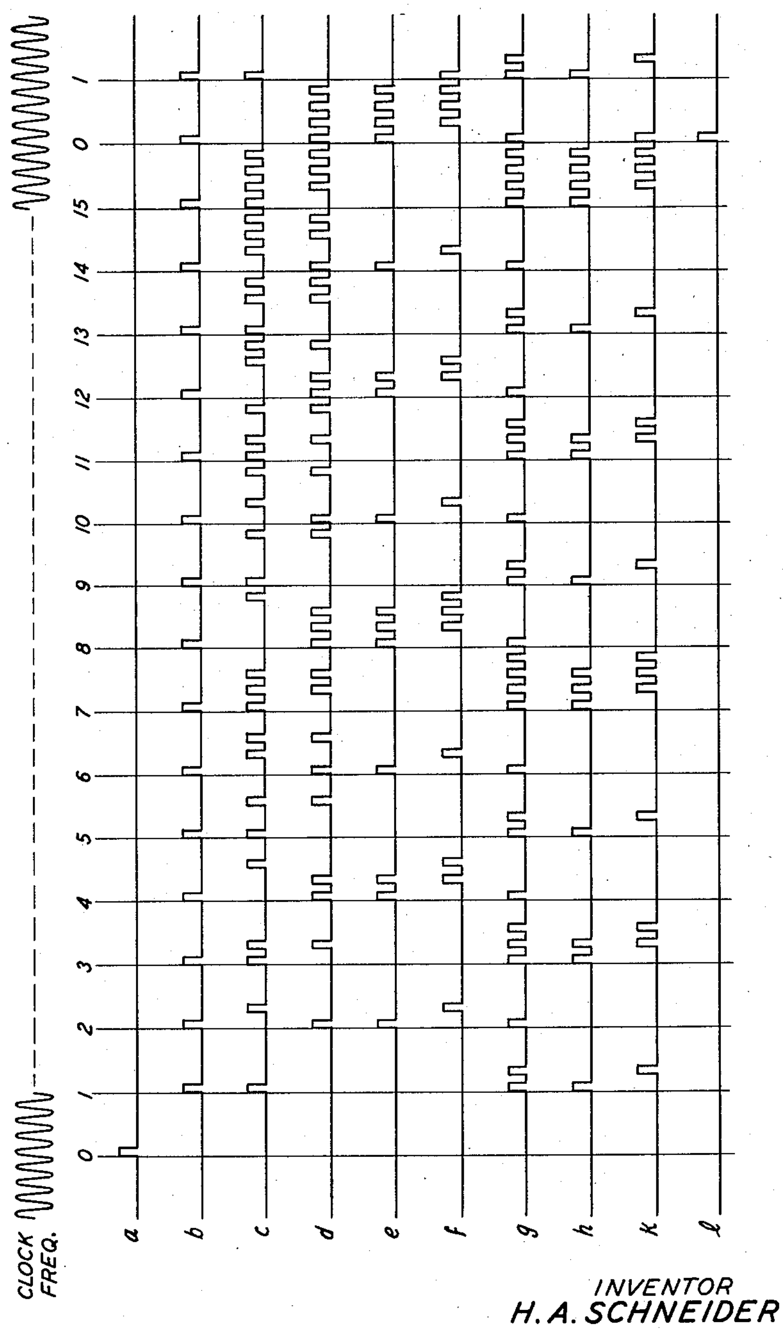
Fig. 3 is a pulse-time chart depicting the occurrences of pulses at various points in the embodiment of Fig. 2.

In Fig. 3 are depicted the pulses occurring at different points in the circuit of Fig. 2 during the operation of that circuit; the points are labeled *a, b, c, d, e, f, g, h, k,* and *l* and will be further identified in the description of the circuit. The base or clock frequency is also shown on Fig. 3, although it does not appear explicitly in Fig. 2. However, it is to be understood that clock signals are applied to various components, such as amplifiers, within the circuit, as more clearly seen in the circuit schematic of Fig. 4. The pulses occur during the positive cycles of the clock frequency and in synchronism therewith; the clock frequency thus defines the digit intervals of the circuit.

The initiating pulse from the single pulse generator 10 is applied to the first stage frequency divider 11; the initiating pulse occurs at point *a* and the output of the first stage frequency divider 11, which occurs at point *b*, is a train of pulses, one pulse appearing for each four cycles of the clock frequency as we have assumed, in this embodiment, that $n=4$. The train of pulses *b* is applied through an Or circuit 18 to a half-adder circuit 19. A half adder is a circuit, known in the art, which has an output on a first lead if one of two, but not both, inputs is present and an output on a second lead if both inputs are present. The first of these outputs, usually referred to as the sum output, appears at point *c* and the second, usually referred to as the carry output, at point *e*. The sum output at *c* are trains of pulses representing successive binary digits from 1 to $2^n$, which in this embodiment is from 1 to 16. To facilitate an understanding of the time chart of Fig. 3 the decimal equivalent of each binary number is written just above the pulses at *c*. These pulses appear in the four digit time slots or intervals defined by the clock frequency. For larger values of $n$ there would of course be more time slots defined between successive pulses at point *b* and the outputs at point *c* would include binary numbers of a larger number of digits.

The pulses appearing at point *c* are passed through a delay line 21, which advantageously has $n$ digits of delay, and then applied as the second input, at point *d*, to the half-adder circuit 19. The input at point *d* is thus the output at point *c* delayed by four digits of the clock frequency. In the overall system four digits would probably represent one word or information message unit. When a pulse at *b* and a pulse at *d* coincide, the output of the half adder 19 is a pulse at point *e*, rather than at point *c*; this pulse at point *e* is a carry pulse and is passed through one digit of delay, by a delay line 22, to the Or circuit 18. The delayed pulse from point *e* applied to the Or circuit 18 appears at point *f*.

We can thus now state the conditions for operation of the half-adder circuit 19; these are: an output appears at *c* if there is an input at *d* or an input at *b, f,* or *b* and *f* but not if there is an input at *d* and at *b* or *f*; and an output appears at *e* if there is an input at *d* and an input at *b* or *f*.

When the output at *c* is a train of pulses corresponding to the capacity of the delay line 21, a pulse is to be gated to the output lead 16. This gating is attained by a pair of And circuits 24 and 25 and a one digit delay line 26. The output at point *c* is applied as one input to the And circuit 24; the other input, at point *g*, is from an Or circuit 28, one input of which is from point *b* and the other input of which is from point *k*. The output of the And circuit, at point *h*, is delayed one digit by the delay line 26 and applied, at point *k*, as one input of the And circuit 25, the other input of which is from point *b*.

The gate circuit 14, referred to in the description of the block diagram of Fig. 1, can be seen in the diagram of Fig. 2 to include the Or circuit 28, And circuits 24 and 25, and the one digit delay line 26. This circuit is a memory circuit which is triggered during the first digit interval, by a pulse from point *b* through Or circuit 28, if there is an output at *c* and which circulates a pulse as long as there is an output at *c* for each digit interval. If this occurs, the pulse is gated to the output lead 16, during the first digit interval of the next number, by a pulse from *b* applied to And circuit 25. This circuit thus requires that each digit interval be filled before a pulse can be gated to the output lead. As this only occurs, for the case of $n=4$, when the binary half adder has counted up to $2^4$, i.e. 16, an output pulse is gated only once every sixteen words or once for every sixteen input pulses which in turn are applied once each word or once each four digits of the clock frequency.

In the block diagram of Fig. 2, to facilitate the explanation of the logical components of this embodiment of the invention, ideal circuit elements have been assumed in which no amplification of pulses is required and all delay incurred in the circuit occurs in the delay lines, the other circuit elements not introducing any delay. In fact, however, amplification is required and the other elements do introduce delay so that the delay lines depicted in Fig. 2 must be modified and compensatory delay lines added to take account of this introduced delay and keep the circuit components in synchronism. Fig. 4*a* is a revised block diagram in which the amplifiers and compensatory delay lines have been added and the delay of the priorly mentioned delay lines modified to take account of the delay inherent in the amplifiers. The delay introduced by the amplifiers is, at the clock frequency employed in this embodiment, substantially one quarter digit, and amplifiers 30 are positioned in the first stage frequency divider 11, the half-adder circuit 19, between delay line 21 and the half-adder 19, between delay line 26 and And circuit 25 and in the output lead 16. Accordingly, the delay lines of 22 and 26 is reduced by one quarter digit and of delay line 21 by three quarters digit; the delay loop of delay line 21 includes two amplifiers 30 and the compensatory delay line 38 referred to below, so that the total delay of the loop is 4 digits. Half digit compensating delay lines 32 are included in the paths from the first stage frequency divider 11 to the Or circuit 28 and the And circuit 25; delay lines 32 delay pulses from circuit 11 the equivalent of the delay of the pulses to the other input leads of these circuits, which delay is introduced by the two amplifiers through which these other pulses pass.

The binary half adder may advantageously comprise an Or circuit 35, an And circuit 36, and an inhibitor 37, together with a pair of amplifiers 30 and a one-quarter digit compensatory delay line 38.

The first stage frequency divider may comprise a delay line register in accordance with one aspect of this invention. As seen in Fig. 4*a*, the circuit comprises an Or circuit 40, an amplifier 30, a delay line 41, and a compensatory delay line 42. Delay line 41 serves to introduce $n$ digits of delay to pulses from the Or circuit output back to the Or circuit input. In this specific embodiment the delay line 41 has one and three-quarter digits of physical delay but is terminated in a short circuit so that pulses of opposite polarity are reflected back to the input; accordingly, a positive pulse is applied to the delay line 42 three and one-half digits later. The total delay between the output and input of the Or circuit 40 is thus four digits, comprising the one-quarter digit introduced by the amplifier 30, the three and one-half digits introduced by the delay line 41 and the one-quarter by the delay line 42. Advantageously, the negative pulse from the amplifier 30 which is reflected by the delay line 41, as a positive pulse, is not applied to delay line 42 due to the interposition therebetween of a diode 43, seen in Fig. 4*b*.

The amplifier circuits may advantageously be transistor regenerative amplifiers of the type disclosed in application Serial No. 437,401, filed June 17, 1954, of J. H. Vogelsong. This circuit, which is depicted in the amplifier 30 for the divider 11 in Fig. 4*b*, includes an output transformer having its primary winding connected to the collector of the transistor and at least a pair of secondary windings, one of which is a feedback winding and the other of which an output winding for positive output pulses. If a negative output pulse is desired, as in the amplifier 30 of the divider 11 and the amplifier 30 connected to the inhibitor 37 in the half adder 19, a third output winding is provided and wound in the opposite direction to produce a negative pulse.

The clock frequency is advantageously applied to the emitter of the transistor, as shown in Fig. 4*b*. In this specific embodiment a four phase clock is employed, the phases being identified on the drawing as A, B, C, and D, and being one-quarter digit or 90 degrees of the clock frequency apart. The clock frequency in this embodiment is three megacycles and the delays of the various delay lines in Fig. 4*b* are noted in microseconds in the drawing.

Each of the Or and And logic circuits advantageously comprises a pair of diode elements, such as varistors, biased to enable passage therethrough of only positive pulses in the forward direction, as is known in the art. Each of the delay lines may comprise inductive members and capacitances, as is also known in the art. One particular type of delay line that may be employed comprises coils wound on an insulating rod with button condensers connected between a turn of each coil and ground; such a delay line is shown at page 214 of the book "Components Handbook," J. F. Blackburn, Ed. (M.I.T. Radiation Laboratory Series, Volume 17, 1949).

In the above discussion it has been assumed that the delay in the first divider stage is $n$ digits and that the accumulation in the second divider stage is also $n$ digits; this accumulation in the second stage is the delay between the sum output of the half-adder circuit and the input thereto and is indicated by element 13 in Fig. 1. It represents the storage or accumulation capacity of the second stage of frequency division. However, it can be seen that these two periods of delay need not be the same but may be related to each other by a constant $k$, which may be any positive integer. The frequency division attainable for the possible combinations is then:

| Delay of divider 11 | Delay of line 13 | Resultant Frequency Division |
|---|---|---|
| $n$ | $n$ | $1/(n)(2^n)$ |
| $kn$ | $n$ | $1/(kn)(2^n)$ |

If $n$ is a large number it may be difficult and unwieldy to employ a single short-circuited delay line in the delay line register of the first stage of frequency division. Two such circuits, as depicted in Fig. 5, may be employed together with an And gate 45, the upper circuit including a short-circuited delay line **41*y* having a physical delay of $y/2$ digits and thus introducing a delay of $y$ digits into the circuit and the lower circuit including a short-circuited delay line 41*x* having a physical delay of $x/2$ digits and thus introduced a delay of $x$ digits into the circuit; the amplifiers 30** are here assumed to introduce no delay. If $x$ and $y$ are relative primes, then the resultant frequency division is $1/(x)(y)$ of the base frequency. However, whether they are relatively prime or not, the resultant frequency division is equal to the least common multiple of the individual delays. In this manner very large frequency divisions are attainable in the first stage; in one embodiment six such circuits having individual frequency divisions of 1/19; 1/17; 1/15; 1/14; 1/13; and 1/11 were employed and the resultant frequency division was 1/(19)(17)(15)(14)(13)(11) or 1/9,699,690 of the clock frequency. This is a frequency division of the order of $10^7$ to 1; in one specific embodiment wherein the clock frequency was three megacycles, an output pulse was provided once every 3.23 seconds. It should be noted that the six circuits employed include the numbers containing all the primes less than 20, since 14 and 15 factor as $2\times7$ and $3\times5$.

Fig. 6 is a block diagram representation, again assuming ideal circuit elements, of another specific illustrative embodiment of this invention. In the embodiment of this invention depicted in block diagram form in Fig. 2 very large frequency divisions are possible, but not all desired frequency divisions are attainable. This is because the frequency division is $1/(n)\ (2^n)$ the clock frequency. In the embodiment depicted in Fig. 6 all possible frequency divisions of the word frequency or of the input to the second stage circuit may be attained by presetting a number A into the second stage frequency divider so that the frequency division attainable is $1/(n)\ (2^n-A)$ the clock frequency.

In the embodiment of Fig. 6 the initiating pulse from the single pulse generator 10 is applied to the first stage frequency divider 11 and also, through an Or circuit 50 to a number or word generator 51. As will be recalled from Fig. 3, the first pulse output from the frequency divider 11 is delayed by one word interval after the application of the initial pulse. During that first word interval the word or number placed in the word generator is preset into the second stage frequency divider. The word generator may be of any known configuration, that depicted in the drawing comprising $(n-1)$ one digit delay lines 53 each connected through a diode 54 and a manually operable switch 55 to a common lead 56. The initial pulse is passed through the delay lines in succession and appears on the common lead 56 in those digit slots for which the switches 55 are closed.

This number is then preset into the half adder 19 of the second stage frequency divider through an Or circuit 186, similar to the Or circuit 18 of the prior embodiment, during the word interval before the application of the first pulse from the first stage frequency divider 11.

The second stage frequency divider then accumulates pulses in the delay line 21 as described before, but the accumulation will be finished A pulses earlier due to the number A having been preset into the circuit. The output pulse appearing on the output lead 16 is fed back through the Or circuit 50 to the number generator 51 to preset the number A into the second stage frequency divider at the beginning of the second cycle of operation and is also applied to an inhibitor circuit 58 to inhibit the pulse from the first stage frequency divider 11 while the number A is being preset into the second stage circuit. A may be any number from 0 to $2^n-1$.

As mentioned above the block diagram of Fig. 6 only depicts the logic elements and assumes them to be perfectly lossless and delayless. Actually each delay line 53 would have associated therewith a transistor amplifier and, if the clock frequency is three megacycles, be of only ¾ digit delay to compensate for the one-quarter digit delay of the transistor amplifier.

For some applications it is desired not to have a single output pulse from the frequency divider but a train of pulses occurring for one-half the cycle of the output frequency of the circuit. This is particularly the case if it is desired to pass the pulses through a low pass filter to reconstruct a low frequency sine wave. Another illustrative embodiment of this invention is depicted in Fig. 7 wherein the output is a train of pulses occurring once every digit for the first half of the cycle of the low frequency output of the second stage frequency divider. These pulses provide essentially a square wave which, when passed through a low pass filter, can give the desired sine wave.

An understanding of the operation of this embodiment can be gained from a consideration of the time-pulse chart of Fig. 8. The circuit depicted in Fig. 7 includes the elements of the embodiment of Fig. 2 and a portion of the time chart of Fig. 3, applicable to both embodiments, is repeated in the time chart of Fig. 8. It should be noted, however, that the first line of the time chart of Fig. 8 is the pulse output at point $l$. This pulse is applied directly to one input of a memory cell comprising an Or circuit 60, a one digit delay line 61, and an inhibiting circuit 62. The pulse immediately appears at the output $q$ of the memory cell and circulates in the memory cell, reappearing at $q$ at each digit time or cycle of the clock frequency. The memory cell thus serves initially as a continuous pulse source. To stop this pulse train by turning off the memory cell after the one-half cycle has passed, an inhibiting pulse is applied to the inhibitor 62 at precisely the middle of the cycle.

This inhibiting pulse is derived from a gate circuit comprising the one digit delay line 26, an inhibitor 64, a one digit delay line 65, and an And circuit 66. The one digit delay line 26 and the inhibitor 64 serve as a selector circuit letting only the last pulse of a train appearing at point $h$ appear at point $m$, delayed by one digit. The pulse at point $m$ is passed through the one digit delay line 65 and applied, at point $o$, to one input of the And circuit 66. As will be recalled, a pulse train appears at point $h$ only if a pulse occurs at $c$ in synchronism with a pulse at $b$. Thus only those pulse trains corresponding to numbers having a pulse in the first digit interval enter this gating circuit. Additionally the other input of the And circuit 66 is also the pulse from point $b$. Therefore the output of the And circuit 66, at point $p$, is a pulse at the start of a word or number interval when the prior number, at point $c$, had a pulse at the first digit space and sufficient digits so that the last digit, delayed by two digit intervals, occurs at the first digit interval of the next number. A look at the time chart of Fig. 8 shows that this occurs only after the number "7" has been counted by the half adder 19, so that a pulse only appears at $p$ at the start of the eighth number interval. This, however, is precisely the half-cycle point of the output of the frequency divider in this embodiment. The pulse at $p$ is applied to the inhibiting lead of the inhibitor 62 to turn off the memory cell and stop the train of digit pulses appearing at point $q$.

In the above-described embodiments it has been assumed that the first stage of frequency division is triggered on application thereto of a single initiating pulse. The embodiment depicted in Fig. 9 is of a first stage of frequency division to which is applied, from a clock frequency source 70, a train of clock pulses. These pulses are applied to an inhibitor circuit 71 on one input lead 72 thereof; the first pulse applied appears also on the output lead 73 and is applied to the second stage of frequency division as described above.

The output pulse, however, is also applied to the inputs of $n$ parallel delay lines 75 having delays of from 1 digit time of the clock frequency to $(n-1)$ digit times, inclusive. The outputs of the delay lines 75 are all applied to the other input lead 76 of the inhibitor circuit 71 and prevent the appearance on the output lead 73 of a pulse for the next $(n-1)$ digit times in accordance with the known manner of operation of inhibitor circuits. Accordingly a pulse appears at the output lead 73 of the first stage of frequency division only once every $n$ cycles of the clock frequency, and the circuit accordingly attains a frequency division of $n/1$.

The delay lines 75 connected in parallel are, in effect, a pulse train generator and, in accordance with this aspect of this invention, other types of pulse train generators may be connected between the output lead 73 of the inhibitor circuit 71 and the input lead 76 thereof. One type of pulse train generator employing delay lines that may advantageously be employed is disclosed in my application Serial No. 379,452, filed September 10, 1953, now Patent 2,760,089, granted August 21, 1956.

In Fig. 9 idealized circuit elements have again been assumed. It is to be understood, however, that amplifiers, having certain inherent delays, would be utilized. If these amplifiers are clocked, as disclosed in the prior figures, at the clock frequency of the circuit, then the initiating signal applied from source 70 at each cycle of the clock frequency need not comprise a train of pulses but may actually be a direct current voltage.

It is to be understood that the above-described arrangements are illustrative of the application of the principles of the invention. Numerous other arrangements may be devised by those skilled in the art without departing from the spirit and scope of the invention.

What is claimed is:

1. A frequency divider circuit comprising means for transmitting a single pulse at intervals of $n$ digits of a clock frequency, an adder circuit, means applying the single pulses to said adder circuit, means connecting the output of said adder circuit to the input thereof, said connecting means having a delay of $n/k$ digits, where $k$ is any positive number, and gate means for transmitting an output pulse only on occurrence of a pulse from said transmitting means and from said adder circuit on accumulation of $n/k$ pulses in said connecting means.

2. A frequency divider circuit in accordance with claim 1 wherein said transmitting means comprises an inhibitor circuit, means for applying a train of pulses at said clock frequency to said inhibiting circuit, and delay means connected between the output of said inhibiting circuit and an input thereof.

3. A frequency divider circuit in accordance with claim 1 further comprising means for presetting a number into said adder circuit, said number being any number from 0 to $2^n-1$.

4. A frequency divider circuit in accordance with claim 1 further comprising memory means for transmitting a train of pulses occurring once each digit interval on occurrence of said output pulse and inhibiting means for terminating said train of pulses midway in time between successive ones of said output pulses.

5. A frequency divider circuit comprising means for transmitting a single pulse $n$ digits of a clock frequency after an initiating pulse has been applied thereto and at intervals of $n$ digits thereafter, means for applying an initiating pulse to said transmitting means, an adder circuit, means applying said single pulses to said adder circuit, means connecting the output of said adder circuit to the input thereof, said connecting means having a delay of $n/k$ digits where $k$ is any positive number, and gate means for transmitting an output pulse only on occurrence of a pulse from said transmitting means and from said adder circuit on accumulation of $n/k$ pulses in said connecting means.

6. A frequency divider circuit in accordance with claim 5 wherein said transmitting means comprises a closed loop having a delay of $n$ digits and means for repetitively circulating a pulse through said loop.

7. A frequency divider circuit in accordance with claim 5 wherein said transmitting means comprises a plurality of closed loops, means for repetitively circulating individual pulses in each of said loops, and gating means for transmitting an output only on the appearance of pulses from each of said loops at said gating means, said loops having different delays and $n$ being equal to the least common multiple of the individual delays.

8. A frequency divider circuit comprising a first stage of frequency division for transmitting a pulse at intervals of $n$ digits of a clock frequency, said first stage including a delay line and means for circulating pulses through said delay line, a second stage of frequency division comprising adder circuit means, means connecting the output of said adder circuit means to the input of said adder circuit means, said connecting means having a delay of $n$ digits of said clock frequency, and gate means for transmitting an output pulse on occurrence of a pulse from said adder circuit when $m$ digits are accumulated in said connecting means and a pulse from said first stage, and means for applying a pulse from said first stage, or said second stage, whereby a frequency division of said clock frequency of substantially $1/(n)(2^m)$ is attained.

9. A frequency divider circuit comprising a first stage of frequency division for generating pulses at $1/n$ of a clock frequency, a half-adder circuit, means connecting said first stage of frequency division to one input of said half-adder circuit, first means connecting the sum output of said half-adder circuit to the other input thereof, said first connecting means having a delay of $m$ digits of said clock frequency, second means connecting the carry output of said half-adder circuit to said one input thereof, said second connecting means having a delay of one digit, and gate means, said gate means including an Or circuit, a first And circuit, a one digit delay line, and a second And circuit, said first And circuit being only enabled if a pulse appears on said carry output simultaneously with a pulse from said first stage of frequency division and said second And circuit being only enabled if said pulses on said carry output then occur in each digit interval until the occurrence of the next pulse from said first stage of frequency division, whereby the output of said gate means is a train of pulses at a frequency of $1/(n)(2^m)$ of the clock frequency.

10. A frequency divider circuit comprising a first stage of frequency division for generating pulses at a frequency $1/kn$ of a clock frequency, where $n$ and $k$ are positive whole numbers, a half-adder circuit, means connecting said first stage of frequency division to one input of said half-adder circuit, first means connecting the sum output of said half-adder circuit to the other input thereof, said first connecting means having a delay of $n$ digits of said clock frequency, second means connecting the carry output of said half-adder circuit to said one input thereof, said second connecting means having a delay of one digit, gate means including a pair of And circuits and a one digit delay line therebetween, the first And circuit being only enabled if a pulse appears on said carry output simultaneously with a pulse from said first stage of frequency division and said second And circuit being only enabled if said pulses on said carry output then occur in each digit interval until the occurrence of the next pulse from said first stage of frequency division, means for presetting a number A into said half-adder circuit before each transmission of a predetermined group of pulses from said first stage of frequency division to said half-adder circuit, and means for inhibiting the transmission of a pulse from said first stage of frequency division to said half-adder circuit during presetting of said number A, whereby the output of said gate means is a train of pulses at a frequency of $1/(kn)(2^n-A)$ of the clock frequency, A being any number from 0 to $2^n-1$.

11. A frequency divider circuit comprising a first stage of frequency division for generating pulses at $1/kn$ of a clock frequency, where $k$ and $n$ are positive whole numbers, a half-adder circuit, means connecting said first stage of frequency division to one input of said half-adder circuit, first means connecting the sum output of said half-adder circuit to the other input thereof, said first connecting means having a delay of $n$ digits of said clock frequency, second means connecting the carry output of said half-adder circuit to said one input thereof, said second connecting means having a delay of one digit, gate means including a pair of And circuits and a one digit delay line therebetween, the first And circuit being only enabled if a pulse appears on said carry output simultaneously with a pulse from said first stage of frequency division and said second And circuit being only enabled if said pulses on said carry output then occur in each digit interval until the occurrence of the next pulse from said first stage of frequency division, a memory cell connected to said gate means for transmitting a pulse in each digit on reception of a pulse from said gate means, and means for inhibiting the transmission of pulses from said memory cell after a half cycle of the frequency of the output of said gate means, whereby the output of said memory cell is a train of pulses for the first half cycle of a frequency $(1/(kn)(2^n)$ of said clock frequency.

12. A frequency divider circuit in accordance with claim 11 and further comprising means for presetting a number A into said adder circuit whereby said output of said memory cell is a train of pulses for the first half cycle of a frequency $1/(kn)(2^n-A)$ of said clock frequency, where A is any number from 0 to $2^n-1$.

13. A frequency divider circuit in accordance with claim 11 wherein said inhibiting means includes an And gate, means for transmitting a train of pulses from the sum output of said half-adder circuit to said And gate only if said train of pulses commences simultaneously with a pulse from said first stage of frequency division, means for delaying said train of pulses transmitted to said And gate by two digits, and means enabling said And gate on the next occurrence of a pulse from said first stage of frequency division if a pulse occurred in each digit interval of said train of pulses until two digits before the occurrence of said next pulse from said first stage of frequency division.

14. A composite frequency divider circuit comprising a clock frequency source, a primary frequency division circuit for transmitting output pulses at a submultiple of said clock frequency source, an adder circuit, means for applying output pulses from said primary frequency division circuit to said adder circuit, means connecting the output of said adder circuit to an input thereof, said connecting means having a delay of a plurality of digit periods as established by said clock frequency source, and gate means for transmitting an output pulse only on occurrence of a pulse from said primary frequency division circuit and from said adder circuit.

References Cited in the file of this patent

UNITED STATES PATENTS

| | | |
|---|---|---|
| 2,477,047 | Davis | July 26, 1949 |
| 2,486,491 | Meacham | Nov. 1, 1949 |
| 2,514,036 | Dickenson | July 4, 1950 |
| 2,536,035 | Cleeton | Jan. 2, 1951 |
| 2,568,319 | Christensen | Sept. 18, 1951 |
| 2,602,140 | Fink | July 1, 1952 |
| 2,644,887 | Wolfe | July 7, 1953 |
| 2,665,411 | Frady | Jan. 5, 1954 |
| 2,696,556 | Williams | Dec. 7, 1954 |
| 2,753,455 | Diven | July 3, 1956 |